United States Patent Office 3,652,690
Patented Mar. 28, 1972

3,652,690
2,3-DIBROMO-1,2,4-TRICHLOROBUTANE
Ryoi Ito, Tarumi-ku, and Takeshi Kojima, Hyogo-ku, Japan, assignors to Kanegafuchi Kogaku Kogyo Kabushiki, Kitaku, Osaka, Japan
No Drawing. Filed July 14, 1969, Ser. No. 841,580
Claims priority, application Japan, July 26, 1968, 43/53,123, 43/53,124; Sept. 6, 1968, 43/64,508; Nov. 22, 1968, 43/85,988, 43/85,989
Int. Cl. C07c *19/00*
U.S. Cl. 260—652 R           1 Claim

ABSTRACT OF THE DISCLOSURE

A novel compound 2,3-dibromo-1,2,4-trichlorobutane is formed by reacting bromine and 1,2,4-trichlorobut-2-ene. Such compound may be mixed with an inflammable plastic to form a self-extinguishing composition.

DISCLOSURE

This invention relates to a novel compound 2,3-dibromo-1,2,4-trichlorobutane; method of manufacturing such compound; and compositions employing such compound and inflammable plastics.

When this novel compound is mixed with inflammable plastics, it causes these plastics to become flame resistant. As compared with ordinary known self-extinguishing agents, the use of the present novel compound produces less coloration in the yielded products, and very high self-extinguishing efficiency.

The compound 2,3-dibromo-1,2,4-trichlorobutane (having the molecular formula $C_4H_5Br_2Cl_3$) is a colorless, transparent liquid with a boiling point of about 105 to 106° C./1 mm. Hg, and a refractive index of about 1.565 (25° C.). An elementary analysis of the compound produced the following results:

|  | C, percent | H, percent | Halogen (meq./g.) |
|---|---|---|---|
| Found | 14.95 | 1.55 | 15.65 |
| Calculated ($C_4H_5B_2Cl_3$) | 15.03 | 1.57 | 15.66 |

The 2,3 - dibromo - 1,2,4-trichlorobutane is obtained through a reaction between 1,2,4-trichlorobut-2-ene and bromine carried out by adding the latter to the former.

The 1,2,4-trichlorobut-2-ene is formed together with 1,2-dichlorobuta-1,3-diene, 3,3,4-trichlorobuta-1-ene and other by-products, when about 1 mol of chlorine is reacted with 1 mol of 2-chlorobuta-1, 3-diene (see A. A. Petrov, J. Gen. Chem.(U.S.S.R.) 13, p. 102–7 (1943)). The 1,2,4-trichlorobut-2-ene may be separated and collected from this mixture by means of distillation and used alone to form the inventive compound, or it may be used in the form of the mixture without separation and having the aforementioned by-products included.

Although any arbitrary way of adding bromine is useable, it is preferably added by dropping into the raw material 1,2,4-trichlorobut-2-ene. The bromine is added in an amount equivalent (mol) to that of 1,2,4-trichlorobut-2-ene or in excess amount.

The reaction system of bromine and 1,2,4-trichlorobut-2-ene is held above 0° C., preferably over a range of between room temperature (about 20° C.) to 80° C.

The reaction may be carried out with good results under exposure to light rays, using such light sources as incandescent lamp, ultra-violet lamp or sun light. The reaction is accelerated by adding a free radical initiator. Carrying out the reaction in the presence of both light and free radical initiator produced still better results. These results will become further evident from the following examples, set forth hereinbelow.

Examples of free radical initiators which may be used are such organic peroxides are lauroyl peroxide, benzoyl peroxide, dicumyl peroxide, cumene hydroperoxide, etc., and azo compounds, hydrazines, bibenzyls. The amount of these compounds added to 100 parts by weight (parts will hereinafter refer to parts by weight) of the reaction materials should be less than 10 parts, preferably 0.01 to 3 parts.

At the termination of the reaction, the unreacted bromine is reduced by using sodium sulfite or sodium bisulfite, and removed. Thereafter, the product is water-rinsed and then dried. The reaction may be carried out in a solvent, in which case, the solvent may be reclaimed by distillation. In this way, the 2,3-dibromo-1,2,4-trichlorobutane is obtained. If necessary, further purification may be carried out by distillation.

The 2,3-dibromo-1,2,4-trichlorobutane may be added to such inflammable plastics as polyethylene, polystyrene, styrene-acrylonitrile copolymer resin, polypropylene, etc. and mixtures thereof. The amount of 2,3-dibromo-1,2,4-trichlorobutane to be added differs depending on the kind of plastic employed and the degree of flame resistance desired. As deduced from actual examples, the object of providing flame resistance may be attained by adding the present compound in an amount of less than one part to 100 parts of plastic such as polystyrene.

The 2,3-dibromo-1,2,4-trichlorobutane and inflammable plastics, because of their high mutual affinity, can be readily mixed together homogeneously. They may be mixed by using a kneader or other well known types of mixing machines. In this way, the compositions of self-extinguishing plastics are obtained.

When the compositions of self-extinguishing plastics are mixed with one or more of the free radical initiators mentioned above, the self-extinguishing effect is further enhanced. For example, as deduced from actual examples, notable self-extinguishing effect is achieved by adding less than 1 part of 2,3-dibromo-1,2,4-trichlorobutane and less than 0.5 part of free radical initiator such as dicumyl peroxide to 100 parts of plastic such as polystyrene. This fact will become more evident from the following examples.

The following specific embodiments are given as illustrative of the present invention.

EXAMPLE 1

300 ml. of carbon tetrachloride and 45 g. of 2-chlorobuta-1,3-diene were placed in a flask. The temperature inside of the flask was held at between −10° C. to 0° C. 37 g. of chlorine were blown into the flask, while stirring the mixture, for two hours to cause the reaction. The stirring was continued further for 20 minutes, when the product was washed with an aqueous solution of sodium sulfite, then water-rinsed, dried and distilled under reduced pressure. This produced 6.5 g. of 1,2,4-trichlorobut-2-ene. 50 g. of bromine were dropped into 50 g. of 1,2,4-trichlorobut-2-ene for 2 hours at a temperature of 50° C. while stirring the ingredients. After the reaction of bromine and 1,2,4-trichlorobut-2-ene ended, the reaction solution was washed with an aqueous solution of sodium sulfite and then water-rinsed. This solution was dried by use of dehydrated Glauber's salt, and then distilled under reduced pressure, thus yielding 88 g. of 2,3-dibromo-1,2,4-trichlorobutane.

EXAMPLE 2

200 g. of carbon tetrachloride and 88.5 g. of 2-chlorobuta-1,3-diene were placed in a flask. The temperature inside of the flask was held below 0° C. 71 g. of chlorine were blown into the flask, while stirring the ingredients to cause a reaction thereof. The stirring was continued for one more hour. Then, 180 g. of bromine were dropped into the reacted mixture for period of 3 hours with the mixture held at a temperature of 50° C. The stirring was further continued for 10 hours at the temperature of 50° C. After the reaction ended, the reaction solution was washed first with an aqueous solution of sodium sulfite and then with water. This solution was dried by the use of dehydrated Glauber's salt, and then distilled under reduced pressure. This yielded 240 g. of distillate (70% purity) with 2,3-dibromo-1,2,4-trichlorobutane as the main component.

EXAMPLE 3

50 g. of 1,2,4-trichlorobut-2-ene and 100 ml. of carbon tetrachloride were placed in a flask. Then, while stirring, 50 g. of bromine were added during a two hour period, at a temperature of 20° C. The stirring was continued for 5 more hours, at a temperature of between 30° C. to 40° C. After the reaction ended, the reaction solution was washed first with an aqueous solution of sodium sulfite and then with water. This solution was dried by the use of dehydrated Glauber's salt, and then distilled under reduced pressure thereby yielding 85 g. of 2,3-dibromo-1,2,4-trichlorobutane.

EXAMPLE 4

50 g. of 1,2,4-trichlorobut-2-ene, 300 ml. of carbon tetrachloride and 0.5 g. of lauroyl peroxide were placed in a flask. Then, while stirring, 50 g. of bromine were added dropwise for 30 minutes and at 55° C. The stirring was continued for 30 more minutes. After the reaction ended, the reaction solution was washed first with an aqueous solution of sodium sulfite and then with water. This solution was dried by using dehydrated Glauber's salt, and then distilled under reduced pressure, thus yielding 85 g. of 2,3-dibromo-1,2,4-trichlorobutane.

EXAMPLE 5

50 g. of 1,2,4-trichlorobut-2-ene and 300 ml. of carbon tetrachloride were placed in a flask. Thereafter, while stirring, 50 g. of bromine were dropped into the flask for 30 minutes at room temperature, under irradiation of an incandescent lamp. The stirring was continued for 30 more minutes. After the reaction ended, the reaction solution was washed first with an aqueous solution of sodium sulfite, and then with water. This solution was dried by using dehydrated Glauber's salt, and then distilled under reduced pressure, thus yielding 88 g. of 2,3-dibromo-1,2,4-trichlorobutane.

EXAMPLES 6–12

3.2 g. of 1,2,4-trichlorobut-2-ene were dissolved in 10 g. of a solvent. 3.5 g. of bromine were added then dropwise to the solution for 2 minutes while stirring. The reaction was continued for 5 more minutes.

The effects on the conversion ratio of whether or not the free radical initiator and/or the light irradiation is used, are shown in Table 1. The conversion ration (percent) is equal to $$100 \times \frac{\text{mol of bromine consumed}}{\text{mol of bromine added}}$$

TABLE 1

| Example | Condition of reaction | | | Irradiation of incandescent lamp [3] | Conversion ratio (percent) |
|---|---|---|---|---|---|
| | Temp., °C. | Solvent | Free radical initiator (g.) | | |
| 6 | 55 | Carbon tetrachloride. | Not used | Not used | 47 |
| 7 | 25 | ...do... | ...do... | Used | 98 |
| 8 | 25 | ...do... | LPO [1] 0.007 | Not used | 72 |
| 9 | 25 | ...do... | LPO [1] 0.007 | Used | 99 |
| 10 | 25 | Acetic acid | Not used | Not used | 7 |
| 11 | 25 | ...do... | ...do... | Used | 93 |
| 12 | 25 | ...do... | BPO [2] 0.03 | ...do... | 98 |

[1] Lauroyl peroxide.
[2] Benzoyl peroxide.
[3] The irradiation was made with an incandescent lamp of 500 watts at a distance of about 30 cm.

EXAMPLE 13

100 parts of expandable polystyrene beads and 1 part of 2,3-dibromo-1,2,4-trichlorobutane obtained in Example 1 were mixed well. Thereafter, the mixture was extruded at a temperature of 140° C. by use of an extruder having an inside diameter of 40 mm. and nozzle diameter of 7 mm. A test piece of the extruded material having thickness of 10 mm., width of 25 mm. and length of 200 mm. was subjected to a combustion test according to test method JIS–A–9511. JIS is an abbreviation for Japanese Industrial Standard. The tests were conducted in a similar manner with other self-extinguishing agents. The results are shown in Table 2.

TABLE 2.—RESULTS OF COMBUSTION TESTS

| Test number | Self-extinguishing rate (percent) [3] | Self-extinguishing time (sec.) [4] | Self-extinguishing distance (mm.) [5] |
|---|---|---|---|
| 1. This invention | 100 | Shorter than 1 | 0. |
| 2. Contrast [1] | 50 | Longer than 3 | Some did not self-extinguish. |
| 3. Contrast [2] | 100 | 1.5 | 1.3. |

[1] When tetrabromobutane was added in 3%.
[2] When 1,2,3,4-tetrabromo-2-chlorobutane was added in 2%.
[3] The proportion of the number of pieces of the six test pieces tested which self-extinguished.
[4] The average time of six test pieces tested before they self-extinguished.
[5] The average distance of six test pieces tested burnt before they self-extinguished.

EXAMPLE 4

100 parts of expandable polystyrene beads and 1 part of the distillate (purity 70%) with the 2,3-dibromo-1,2,4-trichlorobutane obtained in Example 2 as its main component, were mixed well. Thereafter, the mixture was extruded at a temperature of 140° C. using an extruder having an inside diameter 40 mm. and nozzle diameter 7 mm. A test piece of the extruded material having thickness of 10 mm., width of 25 mm. and length of 200 mm., was combustion tested according to test method JIS–A–9511. The self-extinguishment occurred within one second.

EXAMPLE 15

100 parts of styrene-acrylonitrile copolymer (containing 75% styrene) and 5 parts of 2,3-dibromo-1,2,4-trichlorobutane obtained in Example 1 were dissolved in 1700 parts of acetone at 50° C. This solution was poured onto a glass plate, thereby forming a film 30 cm. long, 9 cm. wide and 0.1 mm. thick. This film was left for 24 hours at room temperature. Thereafter, the film was detached from the glass plate, and then dried at 70° C. for 30 minutes. The film, thus obtained, was held erect, and a flame 3.8 cm. long of a burner was applied to the film for 5 seconds. The flame was taken away from the object and self-extinguishment occurred within 3 seconds.

EXAMPLE 16

100 parts of styrene-acrylonitrile copolymer (containing 75% styrene) and 5 parts of the distillate with the 2,3-dibromo-1,2,4-trichlorobutane obtained in Example 2 as its main component, were dissolved in 800 parts of acetone held at 50° C. A film of length 30 cm., width 90 cm. and thickness 0.1 mm. was formed by pouring this solution onto a glass plate. This film was left at room temperature for 24 hours. Then the film was detached from the glass plate, and dried at 70° C. for 30 minutes. The film was held erect and a flame 3.8 cm. long of a burner was applied to the film for 5 seconds. After the flame was removed from the object, self-extinguishment occurred within 3 seconds.

EXAMPLE 17

A test piece was prepared by using the same materials and in the same way as in Example 13, except that in place of 1 part of 2,3-dibromo-1,2,4-trichlorobutane of Example 13, (1) 0.1 part of the same self-extinguishing agent and 0.2 part of cyclohexanoneperoxide, and (2) 0.6 part of the same self extinguishing agent and 0.2 part of cumene hydroperoxide, were used. The combustion test was conducted according to test method JIS-A-9511. The result of self-extinguishment was similar to that obtained in Example 13.

EXAMPLE 18

A test piece was prepared by using the same materials and in the same way as in Example 14 except that in place of 1 part of the distillate (purity 70%) with 2,3-dibromo-1,2,4-trichlorobutane as its main component of Example 14, (1) 0.6 part of the same self-extinguishing agent and 0.2 part of cyclohexanone peroxide, (2) 0.6 part of the same self-extinguishing agent and 0.2 part of dicumyl peroxide and (3) 0.6 part of the same self-extinguishing agent and 0.2 part of cumene hydroperoxide, were used. The combustion test was conducted according to test method JIS-A-9511. Similar self-extinguishment to that in Example 14 was achieved.

What is claimed is:
1. The compound 2,3-dibromo-1,2,4-trichlorobutane.

References Cited

Belyavskii et al., Chem. Abst. 55 (1961) 22091d.
Nesmeyanov et al., Chem. Abst. 50 (1956) 16658h.
Tarrant et al., Jour. Am. Chem. Soc. 80 (1958), pp. 1711–1713.

HOWARD T. MARS, Primary Examiner

U.S. Cl. X.R.

204—163; 260—DIGEST 24, 25.7 R, 654 H, 658 R, 660